United States Patent
Oliver et al.

(10) Patent No.: US 7,302,591 B2
(45) Date of Patent: Nov. 27, 2007

(54) ACCESS CONTROL

(75) Inventors: Huw Edward Oliver, Bristol (GB);
Johannes Maria Victo Daanen, Bristol (GB); John Cushnie, Milnthorpe (GB); Sean Brown, Hampton (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 888 days.

(21) Appl. No.: 10/347,123

(22) Filed: Jan. 17, 2003

(65) Prior Publication Data

US 2003/0177250 A1  Sep. 18, 2003

(30) Foreign Application Priority Data

Jan. 19, 2002 (GB) .................. 0201228.4

(51) Int. Cl.
*H04L 9/32* (2006.01)
*G06F 7/04* (2006.01)
*H04L 29/00* (2006.01)

(52) U.S. Cl. .................. 713/193; 726/21; 726/28
(58) Field of Classification Search .......... 726/21, 726/28, 29, 30; 713/193
See application file for complete search history.

(56) References Cited

U.S. PATENT DOCUMENTS

| | | | | |
|---|---|---|---|---|
| 5,845,281 A | 12/1998 | Benson et al. | ............ | 707/9 |
| 6,154,172 A | 11/2000 | Piccionelli et al. | ......... | 342/357 |
| 6,308,273 B1 | 10/2001 | Goertzel et al. | ............ | 713/201 |
| 2001/0034833 A1 | 10/2001 | Yagasaki et al. | ............ | 713/156 |
| 2002/0082997 A1* | 6/2002 | Kobata et al. | ................ | 705/51 |
| 2005/0021467 A1* | 1/2005 | Franzdonk | .................... | 705/51 |
| 2006/0037066 A1* | 2/2006 | Audebert | ....................... | 726/5 |

FOREIGN PATENT DOCUMENTS

| | | |
|---|---|---|
| EP | 0631453 A2 | 12/1994 |
| EP | 0 997 808 A2 | 5/2000 |
| GB | 2 362 970 A | 12/2001 |
| GB | 2 368 151 A | 4/2002 |
| WO | 00/68764 | 11/2000 |
| WO | 00/68764 A1 * | 11/2000 |
| WO | 01/02933 A1 | 1/2001 |
| WO | 01/44941 | 6/2001 |
| WO | 01/82190 A1 | 11/2001 |
| WO | 02/37246 | 5/2002 |

* cited by examiner

Primary Examiner—Matthew B Smithers

(57) ABSTRACT

A method of controlling access to playable content. The disclosed method includes receiving a request to access playable content having a plurality of associated access criteria, receiving a plurality of credentials, performing a matching process to compare the credentials to the access criteria, and allowing access to the playable content is permitted if the access criteria are met by a logical combination of the plurality of credentials.

22 Claims, 2 Drawing Sheets

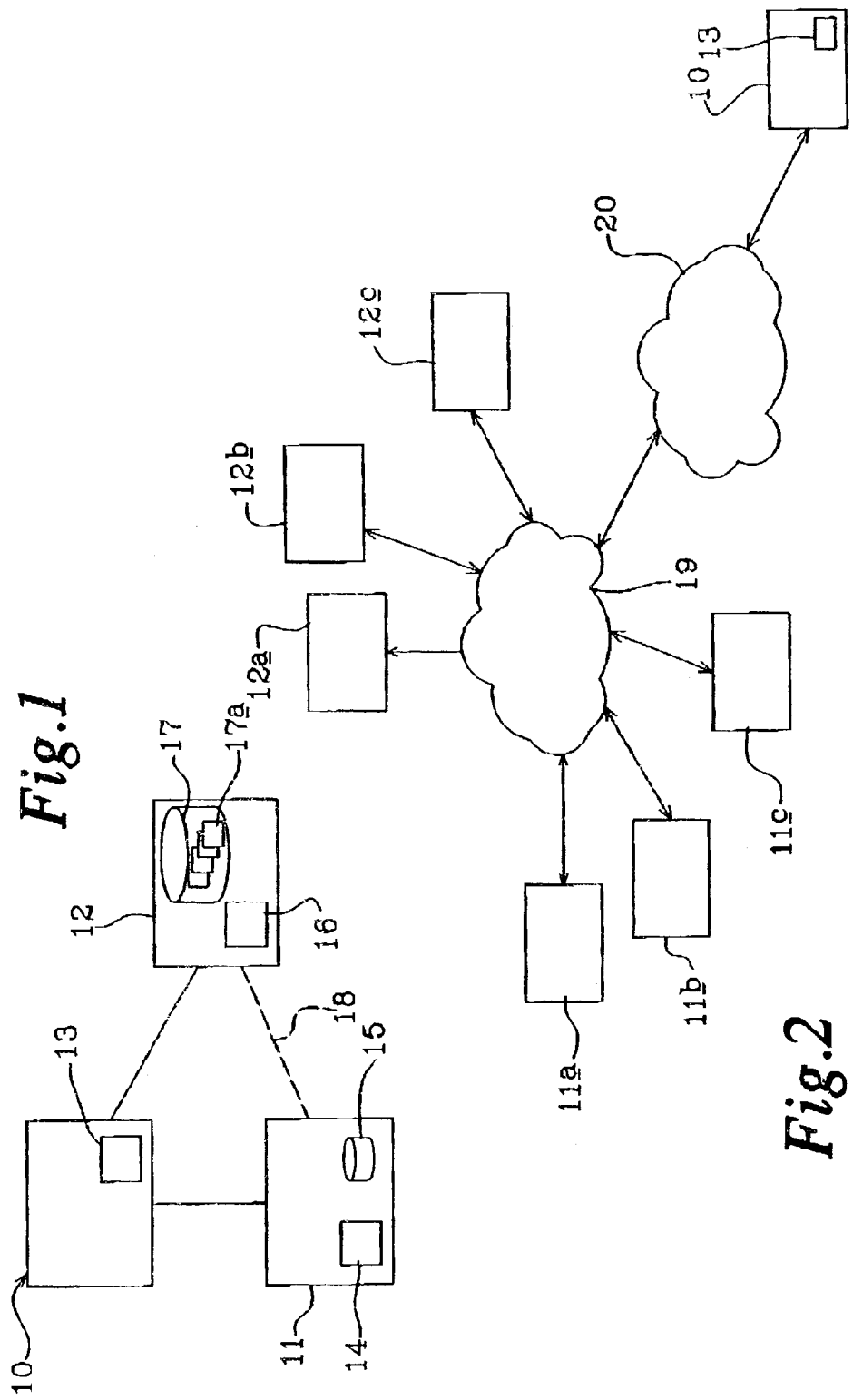

ACCESS CONTROL

FIELD OF THE INVENTION

This invention relates to a method of controlling access to playable content, particularly but not exclusively for controlling access to content provided over the Internet.

BACKGROUND OF THE INVENTION

A great deal of information in the form of multimedia files, hereinafter referred to as "content" is available over the Internet. Such content may, for example, comprise images, audio or video files, HTML pages, text, or any other appropriate form of information as desired. The content may comprise streamed material, such as streamed audio or video information.

It is often desirable to control access to content, such that, for example, the content cannot be accessed by people younger than a particular age, or in a particular geographical location or otherwise as desired. It is known to provide password-protected Internet sites, where a password must be supplied by the user to access restricted pages of the site. However, in this situation the user must first provide personal details to the Internet site provider in order to be issued with a password, with corresponding privacy concerns. To prevent children obtaining access to websites with adult content, age verification schemes are known whereby a user supplies information, such as credit card information and other personal information if requested, to a third party credential provider. The third party credential provider verifies the information, in particular the age of the user, and issues a password or credential to enable the user to access those websites which recognise the password supplied by the third party. A similar system of providing a credential to authenticate a user's identity to allow the user to access a client system without reference by the client system to the credential provider is known, for example the Kerberos authentication scheme. The credential effectively acts as a password to a site and in the case of commercial or adult verification credentials, the user may be reported back to the third part credential provider for billing purposes.

An aim of the invention is to provide a new or improved method of controlling access to playable content.

SUMMARY OF THE INVENTION

According to a first aspect of the invention, we provide a method of controlling access to playable content, the method comprising the steps of receiving a request to access playable content having a plurality of associated access criteria, receiving a plurality of credentials, performing a matching process to compare the credentials to the access criteria, and allowing access to the playable content is permitted if the access criteria are met by a logical combination of the plurality of credentials.

The associated access criteria may each comprise an indication of a credential necessary to access the playable content.

The access criteria may define a set of alternative credentials and the plurality of credentials provide at least one of said set of alternative credentials to allow access to the playable content.

The access criteria may define a set of alternative credentials and the plurality of credentials provide each of said required credentials to allow access to the playable content.

The access criteria may each comprise an indication of a user characteristic necessary to access the playable content and wherein a credential comprises an indication of the user characteristic.

The credentials may be issued by at least one credential provider.

The credential may comprise credential provider information and the matching process may include the step of reading said credential provider information to verify the source of the credential.

The method may be performed by a content provider system, the content provider system being further operable to transmit the playable content in response to the request if the access criteria are met by a logical combination of the plurality of credentials.

The playable content may be played by a content player, wherein the content player may perform the matching process before playing the playable content.

The playable content may be played using a content player, wherein the matching process may be performed by a trusted software element and wherein the content player may be operable to play the playable content when authorised by the trusted software element.

According to a second aspect of the invention, we provide a content provider system operable to supply playable content to a user system, the content provider being operable to receive a request from the user system to access playable content having a plurality of associated access criteria, receive a plurality of credentials from the user system perform a matching process to compare the credentials to the access criteria, and allow access to the playable content if the access criteria are met by a logical combination of the plurality of credentials.

According to a third aspect of the invention, we provide a method of controlling access to playable content by a user, the user performing the steps of acquiring a plurality of credentials from at least one credential provider, requesting playable content from a content provider, the playable content having a plurality of associated access criteria, and supplying the plurality of credentials to a matching process, the matching process comprising the step of comparing the credentials to the access criteria, the user being permitted to access the playable content if the access criteria are met by a logical combination of the plurality of credentials.

The step of acquiring a credential may comprise the steps of the user transmitting a credential request to a credential provider and transmitting user information relating to a user characteristic, the credential provider performing the steps of comparing the user information with a predetermined user characteristic criterion, generating a credential if the user characteristic is in accordance with the predetermined user characteristic criterion, and transmitting the credential to the user.

The user information may comprise geographical information comprising cell information from a cellular telephone communication system.

The user information may further comprise a unique identifier of a mobile communication device.

BRIEF DESCRIPTION OF THE FIGURES

The invention will now be described by way of example only with reference to the accompanying drawings, wherein;

FIG. 1 is a diagrammatic illustration of an embodiment of the present invention

FIG. 2 is a particular configuration of the embodiment of FIG. 1, and

DESCRIPTION OF THE PREFERRED EMBODIMENTS

Figure 3:
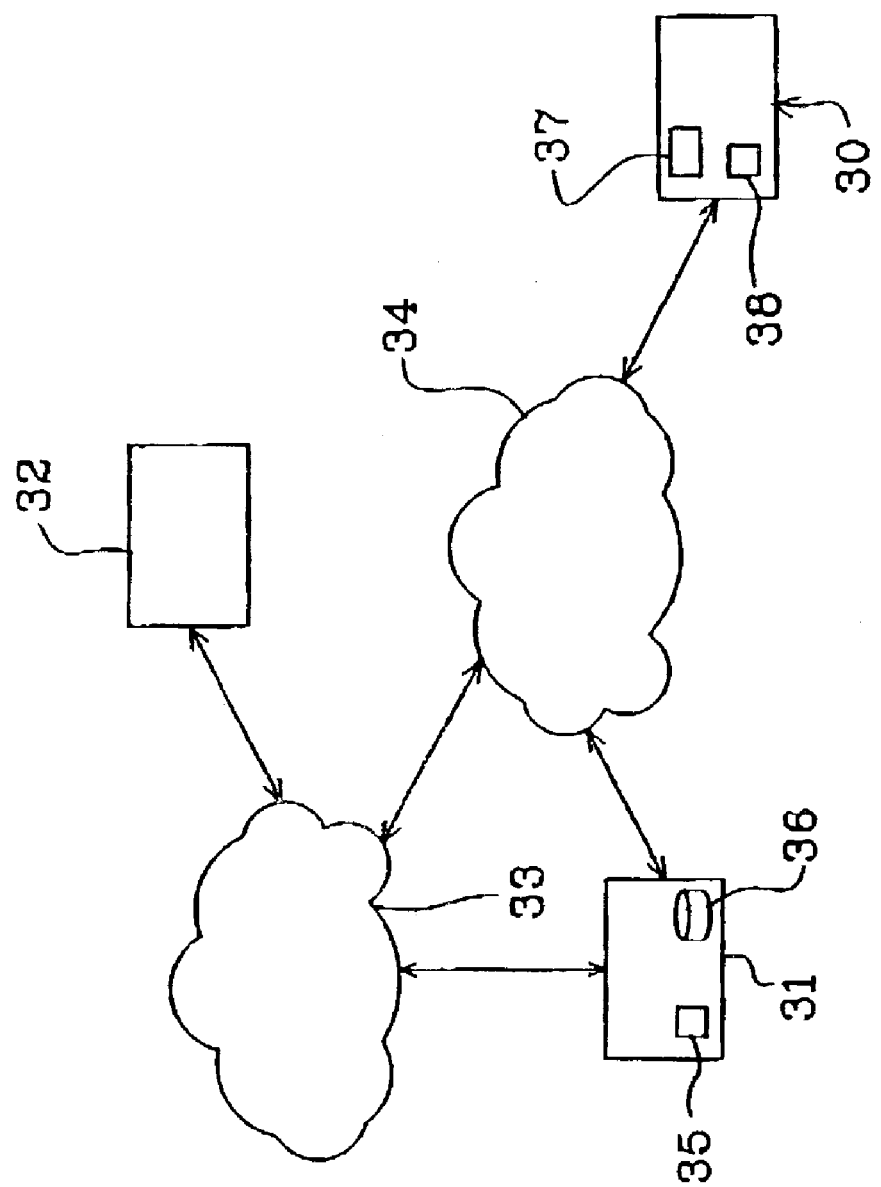
FIG. 3 is a diagrammatic illustration of an application of the embodiment of FIG. 2.

Referring now to FIG. 1, a user system is shown at 10, which is connectable to a credential provider system 11 and a content provider system 12. The user system 10 is provided with a content player 13, operable to receive playable content from the content provider system 12 and play the playable content by outputting or otherwise displaying the content in a fashion accessible to a user. The credential provider system 11, which comprises a trusted provider system, comprises a credential generator 14 and a storage medium 15. The content provider 12 comprises a validation module 16 and a content store 17 comprising a plurality of playable content elements 17a, some or each of which have an associated access criterion.

The invention works as follows. The user of the user system 10 wishes to access some playable content from the content provider 12, but access to the content is in some way limited by the access criterion, for example to people over a certain age. The user system 10 is not able to access the content store 17 and obtain the playable content 17a and/or play the playable content 17a on the content player 13 without an appropriate credential. To obtain a credential, the user system 10 transmits a request for a credential, together with user information comprising user characteristic information to the credential provider system 11. The credential provider system 11 may then verify the user information provided, and compare the user characteristic information with a predetermined user characteristic criterion. For example, the user characteristic information may be the user's date of birth and the criterion may be "over 18". If the criterion is met by the user characteristic information, the credential generator 14 provides a credential, which is transmitted to the user system 10, and in this example the credential and user information are stored in the storage medium 15. In this example, a credential comprises a character or data string encoding relevant information identifying a particular user characteristic and the credential provider system, together with any other information as desired, for example the date and time of generation of the credential and period of validity of the credential. It might also be envisaged that the credential take the form of a software element or agent or be otherwise implemented as desired.

If the user system 10 now attempts to retrieve content from the content store 17, the content provider system 12 requests a credential and the user system 10 can provide the credential generated by the credential provider system 11. The validation module 16 performs a matching process to compare the credential with the access criterion associated with the requested playable content. If the credential is in accordance with the access criterion, the user system 10 is allowed to access to the requested playable content 17a. The content provider system 12 may optionally contact the credential provider system 11, as shown by dashed line 18 to check the validity of the credential. Alternatively, the credential may contain sufficient provider credential information in itself that the validation module 16 can check the credential without contacting the key provider system 11. For example the credential may contain information identifying the credential provider system 11 and confirming that the user of the user system 10 meets the predefined access criterion in this example is above a certain age. To verify that the credential was provided by the credential provider system 11, the credential provider system may have a public key/private key pair in conventional manner. The credential may be encrypted using the private key in conventional manner and may be decrypted using the credential provider system's publicly available public key, thus confirming the credential provider system 11 as the source of the credential. Any other authentication or verification means may be used as desired. If the validation module 16 "trusts" the credential provider 11, the validation module 16 then accepts the credential as being genuine.

Where a credential is to be supplied to a content service provider, the credential may be encrypted using the public key of a public/private key pair associated with the content provider before transmission by the user.

In the alternative, the content player 13 may verify the credential before the content can be played. The authentication of the credential may be performed in like manner to the verification module 16, and may be performed for example by trusted software downloaded to or embedded in the content player 3, or by trusted software embedded in the playable content.

The credential provider system 11 is a trusted system, in that the user identity information supplied to the provider system 11 is not tampered with, is suitably verified, and is not passed on to third parties. Thus, in the example where the credential has to be provided to the validation module 16 before the content provider system 12 win provide access to the desired playable content, the only information supplied from the user system 10 to the content provider system 12 is a credential which confirms that the user is over a certain age. No personal details are supplied to the content provider system 12 with obvious benefits to privacy to the user of the user system 10. Where no validation is sent from the content provider system 12 to the credential provider system 11, there will be no single entity able to combine details of the playable content accessed using the credential and the user information supplied to obtain the credential.

It might be envisaged that together with the credential, other information may be requested without recourse to a credential from a third party credential provider system, for example where the relevant information does not, for example, constitute an unacceptable breach of privacy. The content provider system 12 may for example require a credential confirming the user is greater than a certain age, and an identification number from the content player 13 confirming that the player is of the right type and version to play the requested content.

It will be apparent that the present invention is not necessarily limited to the supply of a single credential. In the example of FIG. 2, the user system 10 is operable to access the Internet 19 via a telephone network 20. A plurality of content provider systems 12a, 12b, 12c, are accessible via the Internet 19, together with a plurality of credential provider systems 11a, 11b, 11c. Each credential provider system 11a, 11b, 11c, may provide one or more credentials corresponding to one or more predetermined user characteristic criteria. For example, the credential provider system 11a may provide a credential confirming that the user is above a certain age, credential provider system 11b may provide a credential confirming that the user is an employee of a particular company, and credential provider system 11c may provide a credential confirming the geographical location of the user. This latter may be confirmed, by for example the user system 10 composing a global positioning system (GPS) system and transmitting the appropriate geographical information to the credential provider system 11c as part of the user identity information. The user system 10 will thus be provided with a plurality of separate credentials.

When the user then wishes to access one of the content provider systems 12a, 12b, 12c, the content provider system may request any logical combination of credentials to meet a set of predefined access criteria. For example, a company content provider system may only require the company identification credential, whilst a streaming video content provider system may require the user system 10 to transmit both the credential providing confirmation of age and the credential confirming the geographical location of the user system 10 before permitting playable content comprising streamed video to be downloaded.

In an alternative as discussed above, the requested content may be downloaded from a relevant content provider system 12a, 12b, 12c, and the content player 13 may perform a marking step then to verify that the user system 10 has been provided with one or more credential from the appropriate credential provider system 11a, 11b, 11c. The credentials may be stored locally on the user system 10 in the form of cookies or in any other form as desired.

It will be apparent that this invention provides a flexible way of controlling access to playable content using a desired set of predefined access criteria. To access the playable content, the user may have to possess each of a required set of credentials before he may access the playable content, or may need to provide at least one of a set of alternative credentials or indeed provide any appropriate logical combination of credentials. Credentials may be provided to validate any required user characteristic criterion, for example, membership of an organisation or group, payment credentials, age, sex, location or any other characteristic as desired. Credentials may be single use or may remain valid depending on the application. The credential provider system 11 may be able to provide credentials for defined or ad hoc groups.

A particular application is shown in FIG. 3.

Referring to FIG. 3, a user system comprising a mobile communication device is illustrated at 30. A credential provider system is shown at 31 and a content provider system is shown at 32. The mobile communication device 30 is connected to the Internet 33 via a cellular telephone communication system 34. The content provider system 32 is accessible via the Internet. The credential provider system 31 is accessible either via the Internet or via the mobile telephone communication network 34. The credential provider system 31 is provided with a credential generator 35 and a storage medium 36. The mobile communication device 30 is provided with a SIM card or similar element having a unique identifier, and an authentication module 38 is also provided on the mobile communications device 30.

In this example, it is desired to limit the access to content provided by the content provider system 32 to consumers within a certain geographical area. In conventional manner, the cellular telephone communication system 34 will be aware of the particular cell of the cellular telephone communication system 39 in which the mobile communication device 30 is located.

In this example, the user identity information is stored in the store 36, and linked with the SIM unique identifier of the SIM module 37. To request a credential, the user of the mobile communication device 30 can contact the credential provider system 31 via the communication network 34 or Internet 33, supply the SIM unique identifier and receive a credential relating to a desired user characteristic from the credential generator 35. The credential is then stored in the SIM module 37.

When the user desires to use the mobile communication device 30 to access playable content from the content provider system 32, the mobile communication device 30 receives the cell information from the cellular telephone communication system 34. The authentication module 38 then combines the credential stored in the SIM module 37 with the cell information received from the system 34 and transmits the combined information to the content provider system 32. The content provider system 32 may then validate the credential and geographical information as discussed with relation to the system FIGS. 1 and 2, and permit or refuse access to the content as appropriate.

Many users for such a system may be envisaged, such as differential pricing for access to content from different geographical areas.

Again, it will be apparent that the only information transmitted to the content provider system 32 will be the credential supplied by the credential provider system 31, the geographical information supplied by the mobile cellular communication network 34 and address information required to transmit the requested playable content to the module communication device 30 via the Internet 33. If it desired even to withhold the geographical information from the content provider system 32, it could be envisaged that the request for a credential would include the geographical information along with the SIM unique identifier. The credential provider 31 could then generate a credential which confirms the general geographical location, for example a region or country, such that the specific cell information is not transmitted to the content provider system 32. If the geographical information comprises specific information for example, it will be apparent that a new credential will necessarily be required each time the mobile communication device 30 moves between cells whereas if the authentication module 38 stores a credential which combines a general credential and the geographical information, then a single stored credential can be used in a plurality of cells. The geographical information may be encoded or certified as desired to confirm its authenticity to the credential provider system 31 and/or the content provider system 32 as desired.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of controlling access to playable content, the method comprising the steps of
    receiving a request to access playable content having a plurality of associated access criteria,
    receiving a plurality of credentials, said credentials being issued by at least one credential provider,
    performing a matching process to compare the credentials to the access criteria, and
    allowing access to the playable content is permitted if the access criteria are met by a logical combination of the plurality of credentials.

2. A method according to claim 1 wherein the associated access criteria each comprise an indication of a credential necessary to access the playable content.

3. A method according to claim 2 wherein the access criteria define a set of alternative credentials and the plurality of credentials provide at least one of said set of alternative credentials to allow access to the playable content.

4. A method according to claim 2 wherein the access criteria define a set of required credentials and the plurality of credentials provide each of said required credentials to allow access to the playable content.

5. A method according to claim 1 wherein the access criteria each comprise an indication of a user characteristic necessary to access the playable content and wherein a credential comprises an indication of the user characteristic.

6. A method according to claim 1 wherein the credential comprises credential provider information and the matching process includes the step of reading said credential provider information to very the source of the credential.

7. A method according to claim 1 wherein the method is performed by a content provider system, the content provider system being further operable to transmit the playable content in response to the request if the access criteria are met by a logical combination of the plurality of credentials.

8. A method according to claim 1 wherein the playable content is to be played by a content player and wherein the content player performs the matching process before playing the playable content.

9. A method according to claim 1 wherein the playable content is to be a played using a content player, wherein the matching process is performed by a trusted software element and wherein the content player is operable to play the playable content when authorised by the trusted software element.

10. A content provider system operable to supply playable content to a user system, the content provider system including:
means operable to receive a request from the user system to access playable content having a plurality of associated access criteria,
means for receiving a plurality of credentials from the user system, the credentials having been previously transmitted by at least one credential provider to said user system,
means for performing a matching process to compare the credentials to the access criteria, and
means for allowing access to the playable content if the access criteria are met by a logical combination of the plurality of credentials.

11. A method of controlling access to playable content by a user, the user performing the steps of;
acquiring a plurality of credentials from at least one credential provider,
requesting playable content from a content provider, the playable content having a plurality of associated access criteria,
and supplying the plurality of credentials to a matching process,
the matching process comprising the step of comparing the credentials to the access criteria,
the user being permitted to access the playable content if the access criteria are met by a logical combination of the plurality of credentials.

12. A method according to claim 11 wherein the step of acquiring a credential comprises the steps of;
the user transmitting a credential request to a credential provider and transmitting user information relating to a user characteristic,
the credential provider performing the steps of comparing the user information with a predetermined user characteristic criterion,
generating a credential if the user characteristic is in accordance with the predetermined user characteristic criterion, and
transmitting the credential to the user.

13. A method according to claim 12 wherein the user information comprises geographical information comprising cell information from a cellular telephone communication system.

14. A method according to claim 13 wherein the user information further comprises a unique identifier of a mobile communication device.

15. A method of controlling access to media content by a user from a content provider, the method comprising the steps of:
transmitting at least one request from the user for at least one credential from at least one credential provider system, the at least one request being accompanied or associated with user characteristic information to allow the at least one credential provider system to verify that the user is entitled to a requested credential, and if so entitled, transmitting the requested credential to the user;
receiving a request from the user at the content provider to access media content having a plurality of associated access criteria, at least of of said associated access criteria being that the user have an appropriate credential supplied by at least one credential provider;
transmitting a request for said appropriate credential to said user;
the user transmitting the requested appropriate credential, which the user previously obtained from one of said at least one credential provider, to said content provider;
receiving the requested credential from the user,
performing a matching process to compare the requested credential to the access criteria, and
allowing access to the media content is permitted if the requested credential matches the access criteria.

16. A method according to claim 15 wherein the access criteria define a set of alternative credentials and the requested credential provides at least one of said set of alternative credentials to allow access to the playable content.

17. A method according to claim 15 wherein the access criteria define a set of required credentials which must be obtained by the user from said at least one credential provider system and supplied to the content provider, the user providing each of said plurality of required credentials to the content provider before being allowed access to the requested media content.

18. A method according to claim 15 wherein the matching process includes the step of verifying validity of the appropriate credential with the credential provider before allowing access to the requested media content.

19. A method according to claim 15 wherein the media content is playable content.

20. A method according to claim 19 wherein the playable content is to be played by a content player and wherein the content player performs the matching process before playing the playable content.

21. A method according to claim 19 wherein the playable content is to be a played using a content player, wherein the matching process is performed by a trusted software element and wherein the content player is operable to play the playable content when authorised by the trusted software element.

22. A method according to claim 19 wherein the playable content is to be a played using a content player, wherein the matching process is performed by said content provider.

* * * * *